Jan. 30, 1962 N. KLOMPAS 3,019,035
MOUNTING MECHANISM FOR LABYRINTH SEAL DISC
Filed Dec. 17, 1957

INVENTOR
N. KLOMPAS

BY: *Maybee & Legris*
ATTORNEYS

United States Patent Office 3,019,035
Patented Jan. 30, 1962

3,019,035
MOUNTING MECHANISM FOR LABYRINTH SEAL DISC
Nicholas Klompas, North York, Ontario, Canada, assignor to Orenda Engines Limited, Malton, Ontario, Canada, a corporation
Filed Dec. 17, 1957, Ser. No. 703,453
2 Claims. (Cl. 285—18)

This invention relates to a method of and a structure for mounting two annular members concentrically and in its most specific embodiment relates to a method of mounting a labyrinth seal ring concentrically with the inner shroud ring of the stator blading of a gas turbine engine.

In machines which have parts spinning at very high speeds it is essential that the spinning parts be perfectly balanced and centered about their axes of revolution so as to eliminate vibrations which would otherwise be set up. When these spinning parts comprise more than one piece, means must be provided to position the parts relative to one another so that perfect coaxial alignment may be obtained.

A gas turbine engine is a machine in which these problems are particularly prevalent and they are made more complex by the need to provide for expansion and contraction of the parts relative to one another over the wide range of temperature which will be encountered in normal service.

Accordingly, it is an object of the present invention to provide means for axially aligning two members which are to be joined together which, in addition, will allow for differential expansion between the two members without adversely affecting their coaxial alignment.

The invention will be described in this specification as being applied to the mounting structure of a labyrinth seal ring to the inner shroud ring of the stator blading of a gas turbine engine. The seal ring to which reference will be made is an annular member in the true geometric sense of the word. However, in other applications use may be made of the invention to join two members of shapes other than truly annular. For example, an annular member may be secured to a hexagonal or octagonal member by means of the invention, and, a square member may be secured to another member by means of the invention. Accordingly, in this specification and in the appended claims the term annulus is intended to include any regular polygon such as a circle, square, hexagon or octagon which is capable of surrounding a surface of revolution so that the surface is at a relatively constant distance from corresponding points on the several sides of the member and, hence, an annular member may be a square member or a hexagonal member or other similar regular polygonal member capable of satisfying the above conditions. In this specification it is also intended that the words "axially" and "radially" when used to describe the direction of a member be interpreted as referred to the axis and radius of the main engine shaft.

Referring now to the drawings which illustrate a specific embodiment of the invention by way of example, like reference numerals will be used to denote like parts in the various views in which.

Figure 1:
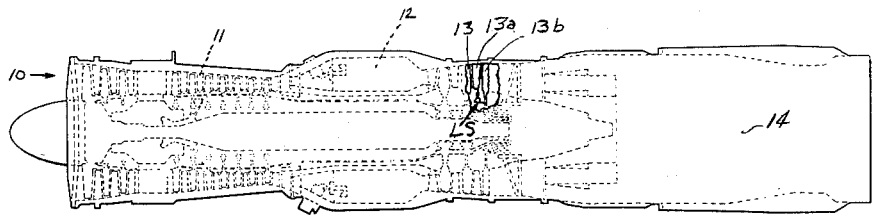
FIGURE 1 is a side elevation of a gas turbine engine partly cut away to show the invention embodied therein.

FIGURE 1 shows an axial flow gas turbine engine having an air inlet 10, a compressor 11 which delivers air from the inlet 10 to a combustion chamber 12 where fuel is injected and burned. The products of combustion pass through the turbine 13 which drives the compressor 11, the remainder of the exhaust gases being ejected rearwardly through the tailpipe 14 to provide a propulsive thrust. A portion of the exterior skin of the engine has been cut away in the region of the turbine 13 to show the internal construction and here it may be seen that a labyrinth seal ring assembly LS is secured to the inner tips of the stator blades 13a of the turbine 13 and extends radially inwardly therefrom into close abutment with a rotating flange secured to the last stage of the rotor blading 13b of the turbine.

Labyrinth seals of this nature are commonly employed in gas turbine engines in locations where it is desired to restrict or prevent the flow of gas from a relatively high pressure area to a relatively low pressure area. Accordingly, it is intended that the disclosure of the invention in this specific embodiment, not be limited to the particular location of the assembly since it will be readily apparent that it may find equally advantageous application elsewhere in the engine for similar purposes.

Figure 2:
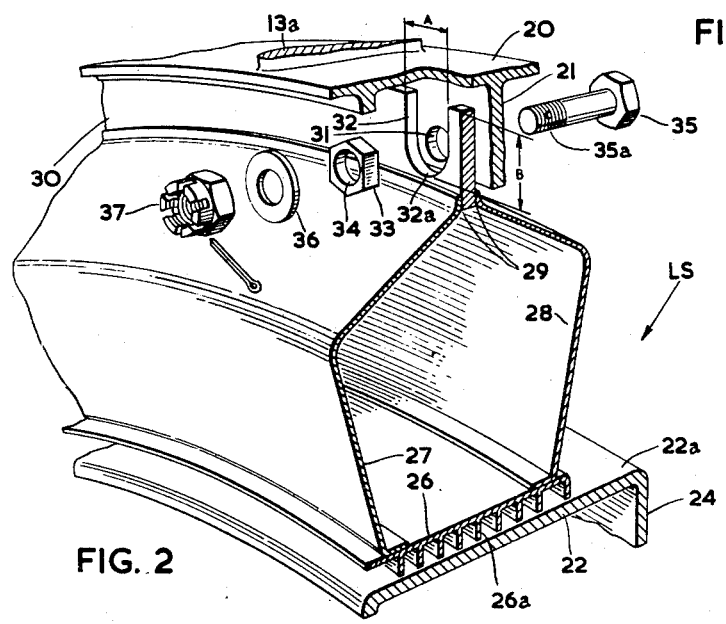
FIGURE 2 is an enlarged and exploded perspective view of a portion of FIGURE 1.

FIGURE 2 is an enlarged view of a portion of the cut away section of FIGURE 1 and shows in detail the ring 20 to which the radially extending inner ends of the turbine stator blades 13a are secured. This ring 20 has extending inwardly therefrom a radial flange 21.

Figure 3:
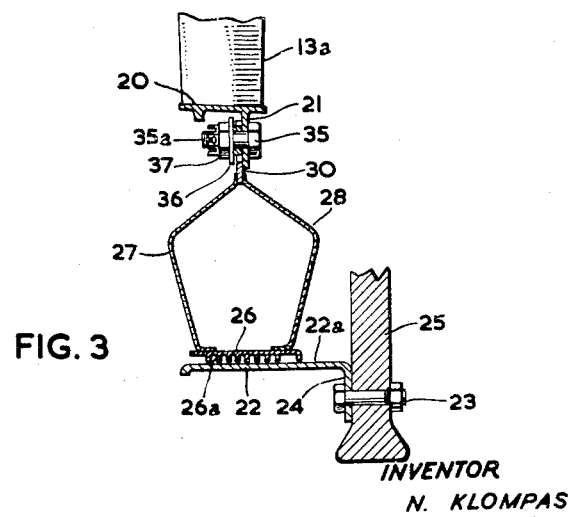
FIGURE 3 is a sectional view of the assembled structure of FIGURE 2.

The labyrinth seal assembly LS is composed of an axially extending cylindrical member 22 which is secured by some convenient means such as bolts 23 passing through radial flange 24, to the rotating turbine disc 25 shown only in part in FIGURE 3. The element carrying the labyrinth seals themselves consists of a plate 26 which, at one end, is curved downwardly to meet the upper surface 22a of the plate 22 and is provided with a plurality of radially inwardly extending ribs 26a in the conventional manner of constructing labyrinth seals. The member 26 is supported by a pair of diverging-converging webs 27 and 28 which, at their point of convergence 29 are secured by welding, brazing or other suitable means to an annular member 30. It is the annular member 30 which it is desired to concentrically mount upon the inwardly extending flange 21.

Towards this end a plurality of holes 31 have been provided in the radially inwardly extending flange 21 on the ring 20. There must be at least three such holes but, in practice, a considerably greater number will probably be employed.

A number of notches 32 equal to the number of holes 31 are provided in the periphery of the annular member 30, the notches extending radially outwardly and being open at the periphery of the member 30.

The notches 32 are of a lateral width indicated by the arrow A which is greater than the diameter of the holes 31 and they are of a depth indicated by the arrow B which is also greater than the diameter of the holes 31 and which will be more particularly defined below.

Since manufacturing tolerances must necessarily be present, it is evident that if only holes of a diameter equal to the diameter of holes 31 were used in the member 30, there would be some difficulty in perfectly aligning all the corresponding holes in the two members. For this reason, the oversize notches 32 have been employed and bushings 33 are provided which are of an outside diameter substantially equal to the dimension A of the notches 32 so that they cannot be circumferentially displaced within the notch 32 in which they are adapted to be seated. The bushings 33 are provided with apertures 34 which are of a diameter equal to the diameter of the hole 31 but which are eccentrically placed within the bushing. From FIGURE 2 it will be seen that the bushing 33 can be inserted in the notch 32 in any one of six positions which will result in the aperture 34 occupying a different position relative to the side walls of the notch. Accordingly, by selecting the position of the bushing 33 within the notch 32 the position of hole 34 can be adjusted so as to perfectly align with the hole 31 in the member 21.

When the annulus 30 is placed in juxtaposition with the inwardly extending radial flange 21 and the notches 32 are aligned with the holes 31 substantially centrally located therein the bushings 33 are inserted in the slots and adjusted angularly about their own axes so that the holes 34 in the bushings align perfectly with the holes 31 in the flange 21. Bolts 35 are then inserted through the holes 31 and 34 in the flange 21 and bushings 33 respectively, a washer 36 slipped over the threaded end 35a of the bolt and a nut 37 is tightened upon the extending threaded end of the bolt. When at least three such bolts have been passed through the apertures described at approximately equally spaced points about the periphery of the annulus 30 and the flange 21, the annulus 30 will be locked in position relative to the flange 21 so that it cannot move in any one direction in the plane of the annulus 30.

The bushings 33, however, are of a thickness greater than the thickness of the annulus 30 so that the surface of the washer 36 which is adjacent the annulus 30 does not contact the annulus 30 regardless of the tension applied to the bolt 35 by the nut 37. Thus, if the annulus 30 is heated it may expand so as to increase in diameter and to accommodate this expansion the dimension B of the slots 32 is sufficiently great that it will provide clearance between the bottom 32a of the slot and the adjacent portion of the bushing 33. It will be appreciated that since this expansion will be uniform throughout the extent of the annulus 30, the concentricity of the annulus 30 with respect to the flange 21 will not be destroyed.

The drawings accompanying this specification illustrate the bushing 33 as being a hexagonal member, however, it will be appreciated that the bushing may be provided with any number of parallel pairs of flats at a common distance apart to provide a close fit with dimension A of the slot. The flats lock the bushing from accidental rotation after assembly, especially from vibration. Preventing rotation of the bushing makes misalignment impossible. The use of circular bushings is known but these bushings are not able ot prevent rotation and hence possible misalignment of the seal. Furthermore, the contact between a circular bushing and the slot is a line and severe fretting at this joint cannot be avoided and misalignment of the seal results. The use of a bushing with parallel pairs of flats, as in the present invention, results in a large contact area between the bushing and the slot so that fretting is reduced to a minimum.

From the above description it will become apparent, as stated earlier in this specification, that the invention has application in centering one member with regard to another member regardless of the shapes of the respective members. A three point suspension system is adequate to prevent movement in any one direction in a plane and, as a result, the minimum required number of holes 31 and slots 32 is three. However, in the interests of rigidity and security it will, in most instances, be desirable to employ more than three holes and slots. Obviously, the invention is not limited to the number of holes and slots which are to be employed and, indeed, the drawings illustrate only one such hole and slot, it being understood that there are at least three such holes and slots spaced about the annular member 30 and the annular inwardly extending flange 21.

What I claim as my invention is:

1. Mounting structure for securing a first annular member on a second annular member that is in coaxial alignment with the first annular member, while permitting differential expansion without misalignment, the first annular member having more than two open ended, radially extending slots spaced around its periphery and adapted to be aligned with a plurality of correspondingly spaced holes in the second annular member, the slots being of a width greater than the diameter of the holes, and of a depth greater than their width, a bushing for each slot, each bushing having a finite number of parallel pairs of flats at a common distance apart, the common distance being substantially equal to the width of the slots so that the bushings may be fitted into the slots, each bushing having a hole eccentrically placed with respect to the centre of the bushing and equal in diameter to the diameter of the holes in the second member, alignment between the holes in the bushings when the bushings are in the slots and the holes in the second annular member being achieved by selecting the appropriate pair of flat sides on the bushings to be in abutment with the sides of the slots, the bushings being of a thickness greater than the thickness of the first annular member, and threaded bolts adapted to pass through the holes in the second member and the bushings, receive washers of an outside diameter greater than the width of the slots and be secured by nuts thereby securing the second annular member to the first annular member while permitting relative sliding movement the adjacent surfaces of the bushings and the slots to accommodate differential expansion between the two annular members.

2. A structure as claimed in claim 1 where the bushing is hexagonal in external configuration.

References Cited in the file of this patent
UNITED STATES PATENTS
1,854,277   Schatz _____ Apr. 19, 1932